(12) United States Patent
Lee et al.

(10) Patent No.: US 10,298,746 B2
(45) Date of Patent: May 21, 2019

(54) MOBILE TERMINAL AND METHOD FOR CONTROLLING SAME

(71) Applicant: LG ELECTRONICS INC., Seoul (KR)

(72) Inventors: Jungbin Lee, Seoul (KR); Jipyo Hong, Seoul (KR); Sooyon Chung, Seoul (KR); Soyeon Yim, Seoul (KR); Jisun Lee, Seoul (KR); Eugene Myung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/743,991

(22) PCT Filed: Jul. 5, 2016

(86) PCT No.: PCT/KR2016/007259
§ 371 (c)(1),
(2) Date: Jan. 11, 2018

(87) PCT Pub. No.: WO2017/018680
PCT Pub. Date: Feb. 2, 2017

(65) Prior Publication Data
US 2018/0205820 A1    Jul. 19, 2018

(30) Foreign Application Priority Data

Jul. 29, 2015 (KR) .................. 10-2015-0107123
Aug. 17, 2015 (KR) .................. 10-2015-0115220

(51) Int. Cl.
*H04M 1/00* (2006.01)
*H04M 1/725* (2006.01)
(Continued)

(52) U.S. Cl.
CPC .......... *H04M 1/72583* (2013.01); *G06F 3/01* (2013.01); *G06F 3/041* (2013.01); *G06F 3/048* (2013.01);
(Continued)

(58) Field of Classification Search
CPC ...... H04M 1/72583; G06F 3/01; G06F 3/041; G06F 3/048; G06F 3/0482; G06F 3/0488
(Continued)

(56) References Cited

U.S. PATENT DOCUMENTS 7,822,443 B2 * 10/2010 Kim ...................... G06F 3/0485
                                                        345/173
8,935,627 B2    1/2015 Ryu et al.
(Continued)

FOREIGN PATENT DOCUMENTS

| KR | 101319264 | 10/2013 |
|----|-----------|---------|
| KR | 101384535 | 4/2014 |
| KR | 101513024 | 4/2015 |

OTHER PUBLICATIONS

PCT International Application No. PCT/KR2016/007259, Written Opinion of the International Searching Authority dated Oct. 7, 2016, 31 pages.
(Continued)

*Primary Examiner* — Sonny Trinh
(74) *Attorney, Agent, or Firm* — Lee, Hong, Degerman, Kang & Waimey PC

(57) ABSTRACT

The present invention relates to a mobile terminal and a method for controlling same, the mobile terminal comprising: a touch screen for displaying information on a screen; and a control unit which controls the touch screen so that, if an input of a touch gesture touching with a pressure below a predetermined level and dragging in a first direction is received on the screen, a first function screen is displayed
(Continued)

and, if an input of a touch gesture touching with a pressure at or above the predetermined level and dragging in the first direction is received on the screen, a second function screen is displayed. Accordingly, a display unit in the "off" state can display time information or notification information according to a touch command which has been input.

20 Claims, 18 Drawing Sheets

(51) Int. Cl.
| | | |
|---|---|---|
| *G06F 3/0488* | (2013.01) | |
| *G06F 17/30* | (2006.01) | |
| *G06F 3/01* | (2006.01) | |
| *G06F 3/041* | (2006.01) | |
| *G06F 3/048* | (2013.01) | |
| *G06F 3/0482* | (2013.01) | |

(52) U.S. Cl.
CPC .......... *G06F 3/0482* (2013.01); *G06F 3/0488* (2013.01); *G06F 17/30* (2013.01); *H04M 1/725* (2013.01); *Y02D 70/00* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/26* (2018.01)

(58) Field of Classification Search
USPC ........ 345/156, 173, 174, 175, 689; 455/566, 455/158.4
See application file for complete search history.

(56) References Cited

U.S. PATENT DOCUMENTS

| | | | |
|---|---|---|---|
| 2003/0085870 A1* | 5/2003 | Hinckley | G06F 1/1626 345/156 |
| 2007/0254722 A1 | 11/2007 | Kim et al. | |
| 2010/0005390 A1* | 1/2010 | Bong | G06F 3/0485 455/566 |
| 2011/0264928 A1* | 10/2011 | Hinckley | G06F 1/1626 713/300 |
| 2011/0296334 A1 | 12/2011 | Ryu et al. | |
| 2013/0061175 A1 | 3/2013 | Matas et al. | |

OTHER PUBLICATIONS

European Patent Office Application Serial No. 16830713.0, Search Report dated Feb. 22, 2019, 10 pages.

* cited by examiner (a)　　　　　　　(b)

(a)　　　　　　　(b)

(a)             (b)

(a)             (b)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2016/007259, filed on Jul. 5, 2016, which claims the benefit of earlier filing date and right of priority to Korean Application Nos. 10-2015-0107123, filed on Jul. 29, 2015 and 10-2015-0115220, filed on Aug. 17, 2015, the contents of which are all hereby incorporated by reference herein in their entirety.

TECHNICAL FIELD

The present invention relates to a mobile terminal and controlling method thereof, suitable for performing user authentication through a camera.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Some mobile terminals include additional functionality which supports game playing, while other terminals are configured as multimedia players. More recently, mobile terminals have been configured to receive broadcast and multicast signals which permit viewing of content such as videos and television programs.

To support and increase the mobile terminal functions, it may be able to consider the improvement of structural parts and/or software parts of the mobile terminal.

Meanwhile, a mobile terminal may turn off a display unit to reduce power consumption. It is necessary to have a technology capable of performing various functions in a state that the display unit of the mobile terminal is tuned off.

When a user of a mobile terminal watches pictures via a gallery function provided by the mobile terminal, in order for the user to search for a subject preferred by the user, it is necessary for the user to search for the subject preferred by the user by watching the entire pictures one by one.

DISCLOSURE OF THE INVENTION

Technical Tasks

The present invention is proposed to satisfy the aforementioned necessity or solve the abovementioned problem. A technical task of the present invention is to provide a mobile terminal capable of performing a different function according to pressure strength of a force touch inputted by a user and a method of controlling thereof.

And, the present invention is proposed to satisfy the aforementioned necessity or solve the abovementioned problem. Another technical task of the present invention is to provide a mobile terminal capable of searching for pictures including a subject identical to a specific subject belonging to a picture currently displayed on a screen among pictured stored in advance and displaying the searched pictures and a method of controlling thereof.

Technical Solution

To achieve these and other advantages and in accordance with the purpose of the present invention, as embodied and broadly described, according to one embodiment, a mobile terminal includes a touch screen configured to display information on a screen, and a controller, if an input of a touch gesture touched with pressure less than predetermined strength and dragged in a first direction is received on the screen, configured to control the touch screen to display a screen of a first function, the controller, if an input of a touch gesture touched with pressure equal to or greater than the predetermined strength and dragged in the first direction is received on the screen, configured to control the touch screen to display a screen of a second function.

To further achieve these and other advantages and in accordance with the purpose of the present invention, according to a different embodiment, a method of controlling a mobile terminal includes the steps of receiving an input of a first touch gesture touched with pressure less than predetermined strength and dragged in a first direction on a screen of a touch screen, displaying a screen of a first function in response to the reception of the first touch gesture, receiving an input of a second touch gesture touched with pressure equal to or greater than the predetermined strength and dragged in the first direction on the screen, and displaying a screen of a second function in response to the reception of the second touch gesture.

Advantageous Effects

Effects of a mobile terminal and controlling method thereof according to the present invention are described as follows.

According to at least one of embodiments of the present invention, it is able to display time information or notification information according to a touch command which is inputted in a state that a display unit is turned off.

According to at least one of embodiments of the present invention, it is able to search for pictures including a subject identical to a specific subject currently displayed on a screen using a force touch and provide the searched pictures to a user.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
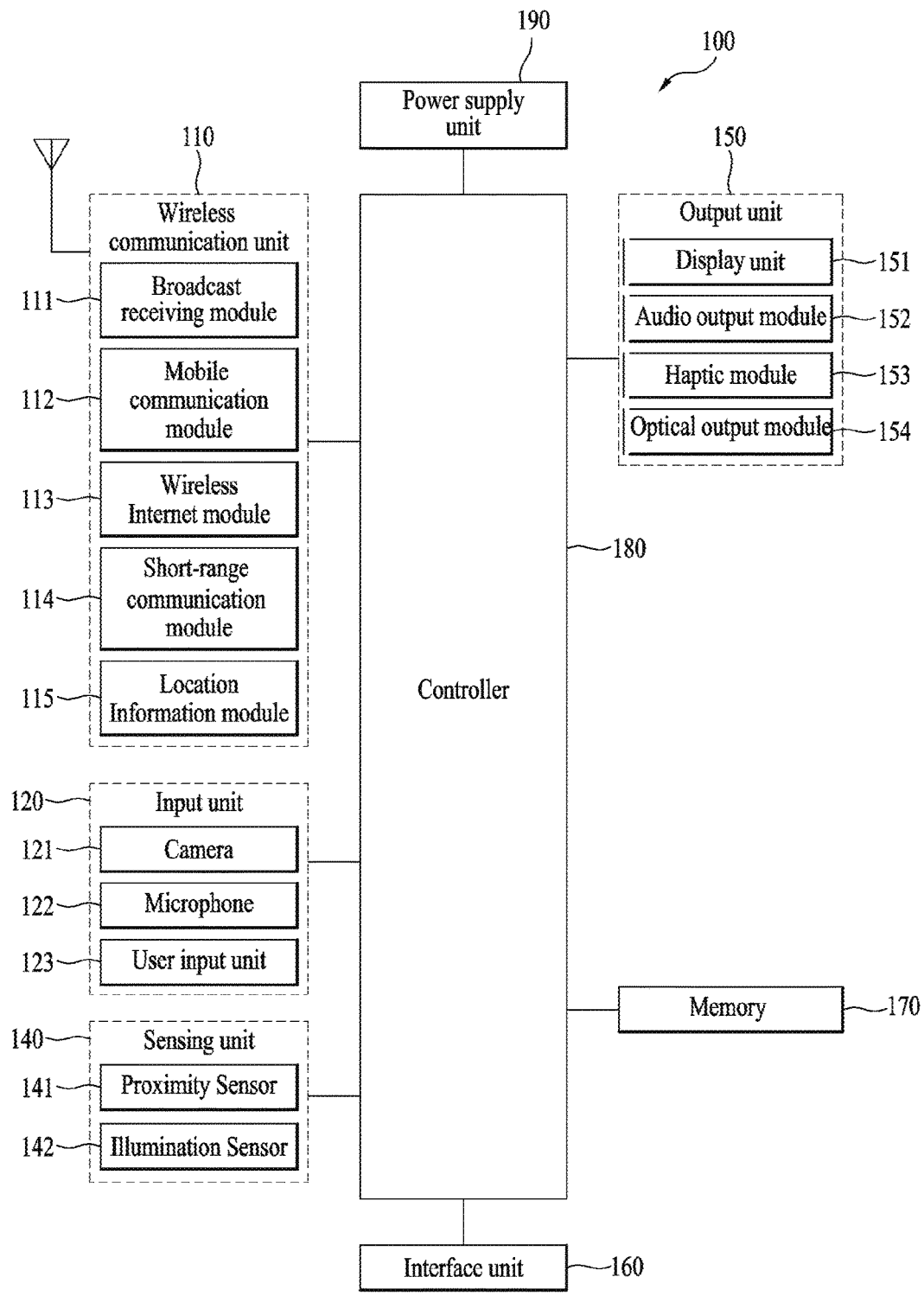
FIG. 1A is a block diagram to describe a mobile terminal related to the present invention.
Figure 1B:
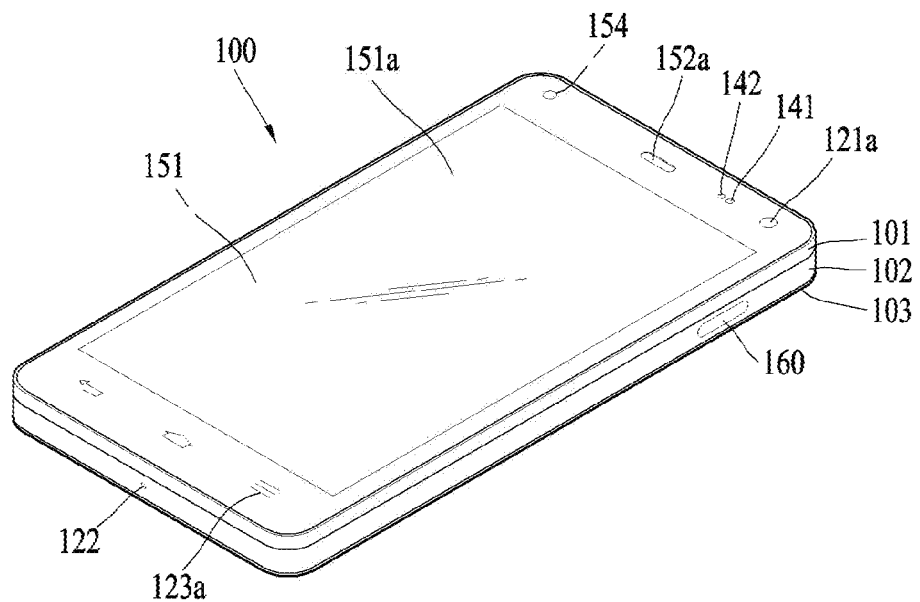
FIG. 1B and FIG. 1C are conceptual diagrams for one example of a mobile terminal related to the present invention in different views.
Figure 1C:
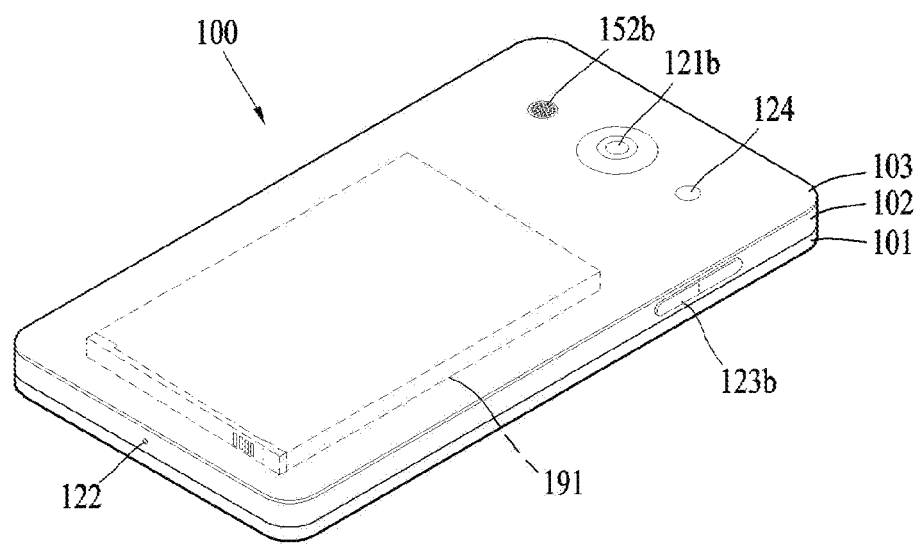

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The sensing unit 140 is typically implemented using one or more sensors configured to sense internal information of the mobile terminal, the surrounding environment of the mobile terminal, user information, and the like. For example, in FIG. 1A, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Moreover, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components can cooperatively operate to implement operations, controls and controlling methods of the mobile terminal according to various embodiments described in the following. The operations, controls or controlling methods of the mobile terminal can be implemented on the mobile terminal by running at least one application program saved to the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi) and Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

In this case, the terminal body can be construed as the concept of indicating the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display an execution screen information of an application operated in the mobile terminal or User Interface, Graphic User Interface corresponding to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Moreover, the display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

In the present drawing, the first manipulation unit 123a is a touch key for example, by which the present invention is non-limited. For instance, the first manipulation unit 123 may include a push key (i.e., a mechanical key) or a combination of the touch key and the push key.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

The battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
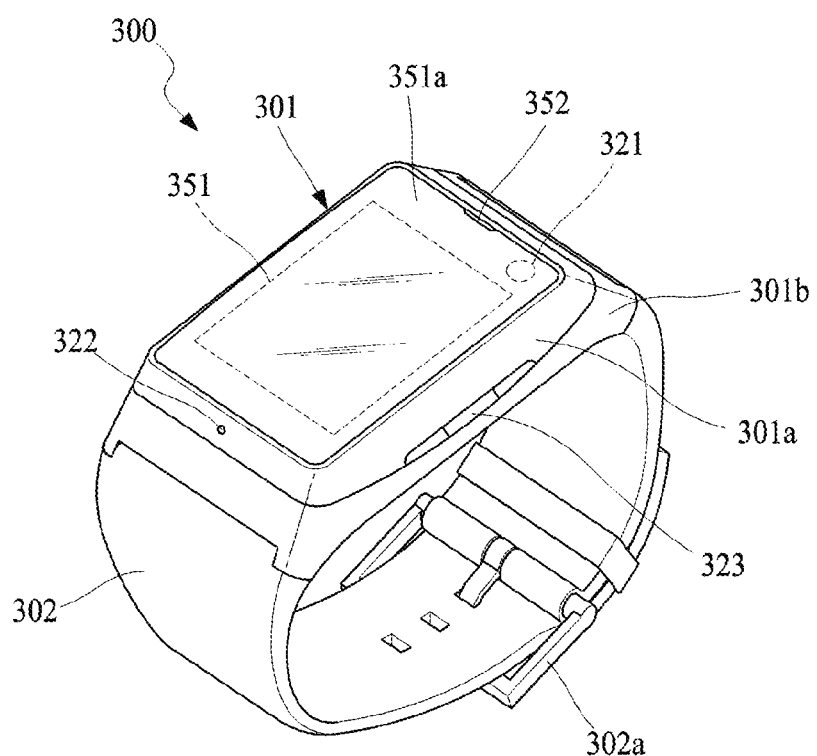
FIG. 2 is a perspective diagram for an example of a mobile terminal of watch-type according to a different embodiment of the present invention.

FIG. 2 is a perspective view illustrating one example of a watch-type mobile terminal 300 in accordance with another exemplary embodiment.

Figure 3:
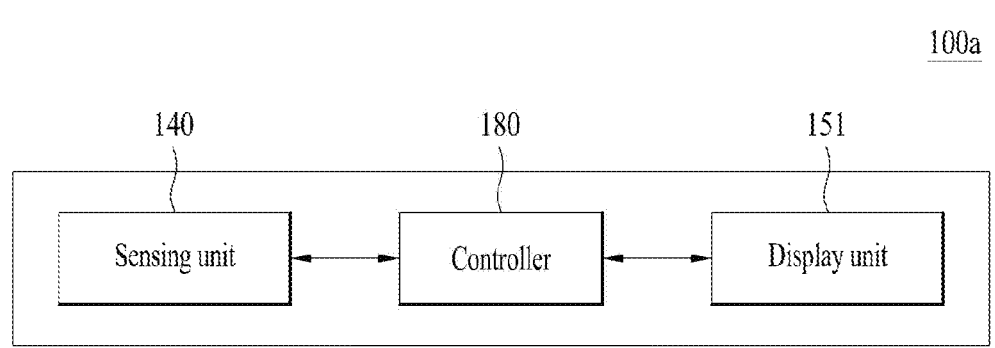
FIG. 3 is a block diagram for a display device according to one embodiment of the present invention.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

In the following, a control method capable of being implemented in the abovementioned mobile terminal and relevant embodiments are explained with reference to attached drawings. It will be apparent to those skilled in the art that various modifications and variations can be made therein without departing from the spirit and scope of the invention.

FIG. 3 is a block diagram for a display device according to one embodiment of the present invention.

Referring to FIG. 3, a display device 100a can include a sensing unit 140, a display unit 151, and a controller 180. The display device 100a corresponds to a device including the display unit 151. If it is able to carry the display device, the display device can be included in a mobile terminal.

The display unit 151 can display contents. The display unit 151 can display time information, notification information, and the like according to an inputted touch command.

The sensing unit 140 can sense a touch inputted on the display unit 151. And, the sensing unit 140 can sense a pressure of a touch. The sensing unit 140 and the display unit 151 can be implemented by a unibody. Or, the sensing unit 140 can be implemented in a manner of being combined with the display unit 151 as a single layer. In particular, the sensing unit 140 can sense a touch gesture inputted on the display unit 151 and sense a pressure of the touch gesture.

The controller 180 can control the sensing unit 140 and the display unit 151. And, the controller 180 senses a touch gesture inputted on the display unit 151 and may be able to perform a function corresponding to the touch gesture. In particular, if a touch gesture touched with a pressure less than predetermined strength is inputted and dragged in a first direction, the controller 180 can execute a first function. And, if a touch gesture touched with a pressure equal to or greater than the predetermined strength is inputted and dragged in the first direction, the controller 180 can execute a second function.

The dragged touch gesture corresponds to a gesture that touches a point of the display unit 151 and moves in a specific direction while maintaining the touch. A flick gesture can also be included in the touch gesture. The touch gesture may start from the display unit 151 or a bezel area surrounding the display unit 151.

First of all, a procedure of executing a different function using a force touch dragged in a specific direction is explained in detail with reference to FIGS. 4 to 15 in the following.

Figure 4:
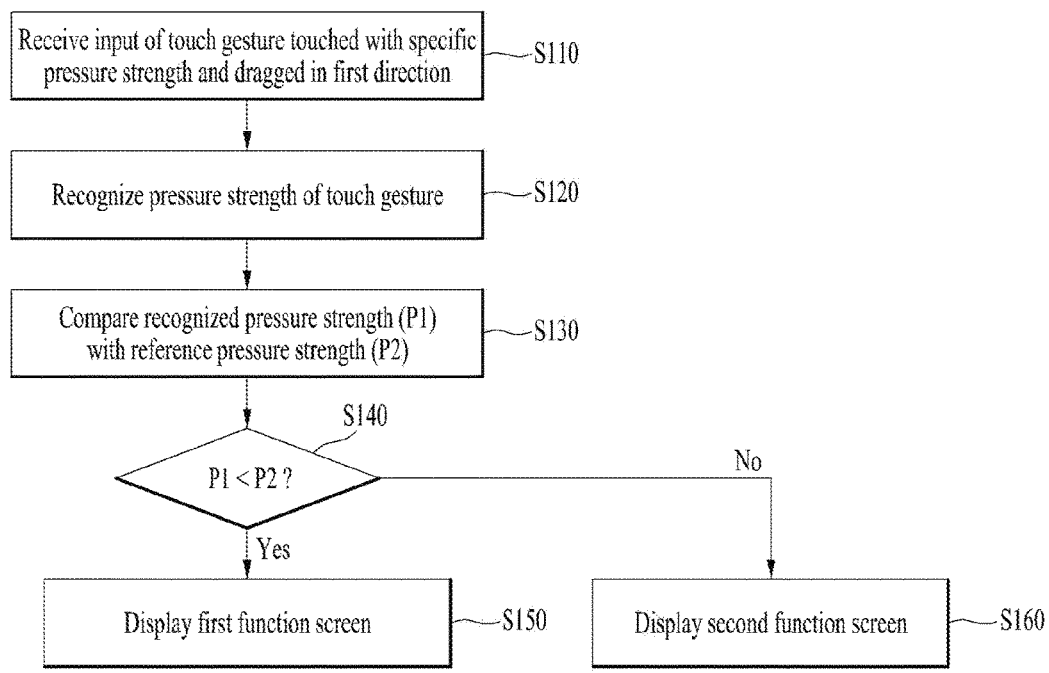
FIG. 4 is a flowchart for a procedure of controlling a mobile terminal according to one embodiment of the present invention.

FIG. 4 is a flowchart for a procedure of controlling a mobile terminal according to one embodiment of the present invention.

FIGS. 5 to 15 are diagrams for explaining a procedure of executing a different function using a force touch dragged in a specific direction.

Referring to FIGS. 4 to 15, if a touch gesture input touched with specific pressure strength and dragged in a first direction is received on a touch screen 151 [S110], the controller 180 of the mobile terminal 100 recognizes the pressure strength of the received touch gesture via the sensing unit 140 [S120].

Subsequently, the controller 180 compares the recognized pressure strength (P1) of the touch gesture with predetermined reference pressure strength (P2) [S130]. If the comparison result says that the recognized pressure strength (P1) of the touch gesture is less than the predetermined reference pressure strength (P2), the controller 180 displays an execution screen of a first function [S150].

And, if the comparison result says that the recognized pressure strength (P1) of the touch gesture is equal to or greater than the predetermined reference pressure strength (P2), the controller 180 displays an execution screen of a second function [S160].

In this case, the first function and the second function can be differently configured depending on a size of the touch screen 151. For example, if the size of the touch screen is equal to or greater than a predetermined size, the first function and the second function may correspond to a function of displaying time and a function of displaying notification information, respectively.

If the size of the touch screen is less than the predetermined size, the first function and the second function may correspond to a function of displaying notification information and a function of displaying use history information of an application, respectively.

If a specific image including a specific subject is displayed on a screen of the touch screen 151, the first function and the second function may correspond to a function of selecting the specific subject from the displayed specific image and a function of searching for an image including an image identical to the displayed specific subject, respectively.

And, if a size of the touch screen 151 is equal to or greater than a predetermined size, the controller 180 can receive a touch input inputted on notification information displayed on a screen and pin the notification information. The controller can display a notification item of the pinned notification information. If the notification item is selected, the controller executes an application related to the notification item and can display contents of the notification item.

If the size of the touch screen 1515 is less than the predetermined size, the controller 180 can sequentially display the displayed notification information and the use history information of the application. And, if the displayed notification information or the use history information of the application is selected, it may be able to execute a relevant application.

Figure 5:
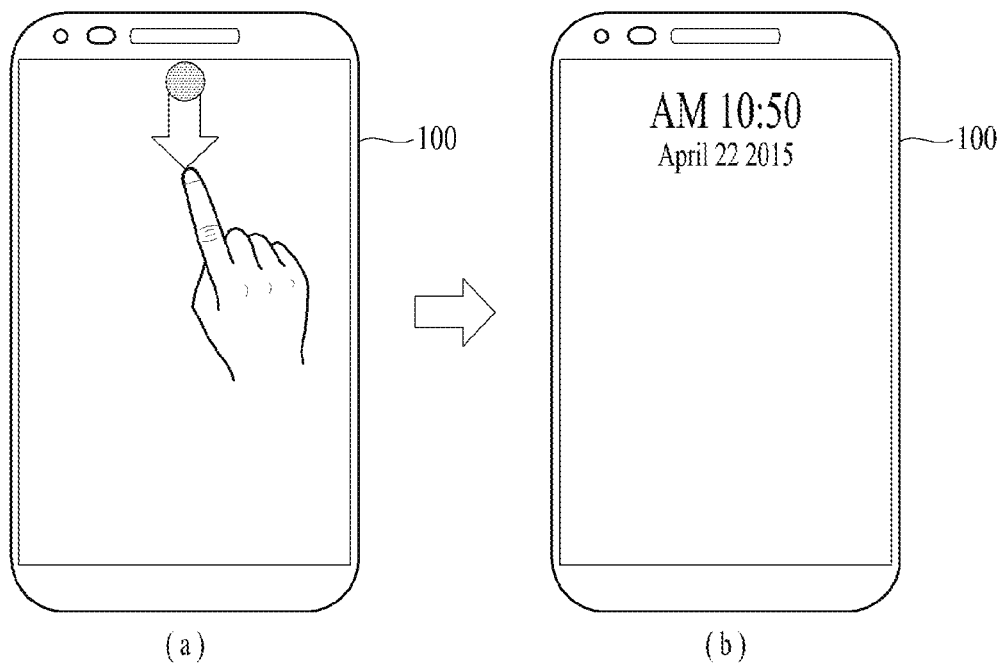
FIGS. 5 to 15 are diagrams for explaining a procedure of executing a different function using a force touch dragged in a specific direction.

FIG. 5 is a diagram for explaining one embodiment of displaying time information.

FIG. 5 (a) illustrates a mobile terminal 100 that receives a touch gesture with a pressure less than the pressure of P2. The mobile terminal may be in a standby state. In particular, a touch screen of the mobile terminal 100 may be in an off state.

The mobile terminal 100 can receive an input of a touch gesture dragged in a first direction. For example, the first direction may correspond to a direction that the touch gesture is dragged from the top to the bottom. The touch gesture may start from one point of the touch screen 151 or a boundary point of the touch screen 151. If the touch gesture is inputted with a pressure less than the pressure of the P2 and is maintained more than a prescribed distance, the mobile terminal can perform a first function.

FIG. 5 (b) illustrates a mobile terminal 100 in which a first function is executed. For example, the first function may correspond to a function of displaying time.

In particular, if a touch gesture input, which is touched with a pressure less than the pressure of the P2 and dragged in the first direction, is received, the controller 180 can execute a function of displaying time. In this case, the function of displaying time may correspond to a function of displaying information such as a date, a day of the week, time, and the like. The controller 180 can maintain the display of the time information for prescribed time. The controller 10 can turn off the touch screen 151 after prescribed time elapsed.

Figure 6:
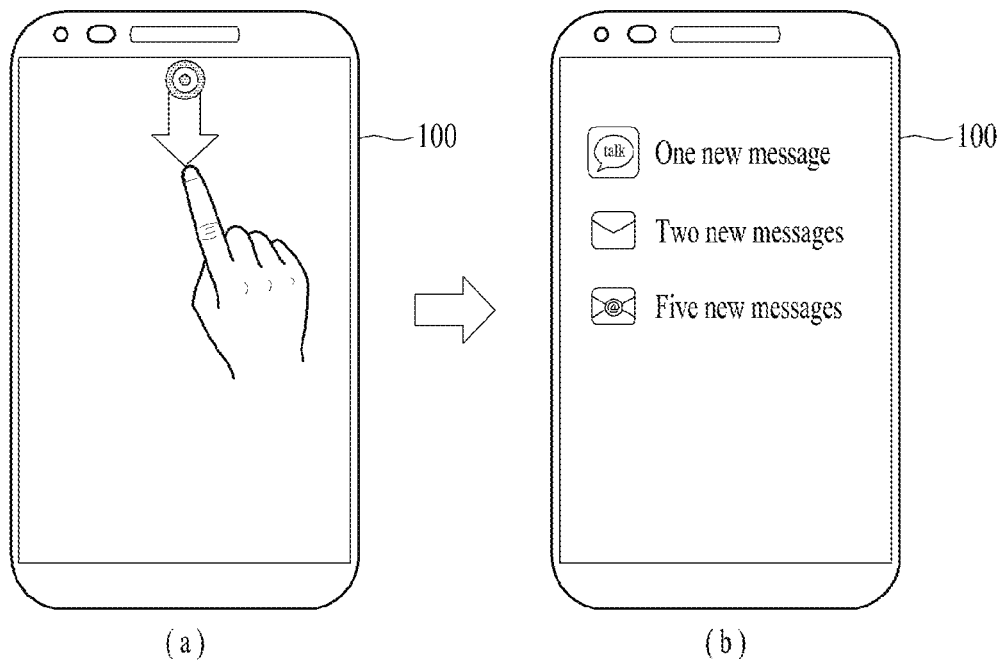

FIG. 6 is a diagram for explaining one embodiment of displaying notification information.

FIG. 6 (a) illustrates a mobile terminal 100 receiving a touch gesture input with a pressure equal to or greater than a pressure of the P2.

In this case, the mobile terminal may be in a standby state. If a touch gesture, which is touched by a user with a pressure equal to or greater than a pressure of the P2 and is dragged in the first direction, is received, the mobile terminal 100 can execute a second function.

FIG. 6 (b) illustrates a mobile terminal 100 in which a second function is executed. For example, the second function may correspond to a function of displaying notification information.

In particular, if a touch gesture touched with a pressure equal to or greater than the pressure of the P2 and dragged in the first direction is received, the controller 180 can execute a function of displaying notification information.

In this case, the function of displaying the notification information may correspond to a function of displaying information related to data received by the mobile terminal 100. For example, the function of displaying the notification information may correspond to a function of displaying information on a type and a number of received calls, received messages, or downloaded contents.

If it is able to display the notification information while the touch gesture is maintained or if predetermined time elapses after the displayed notification is maintained for prescribed time, the controller 180 can turn off the touch screen 151. And, if the predetermined time elapses, the controller 180 can make the displayed notification information disappear only while an on state of the touch screen 151 is maintained.

And, the controller 180 can display a plurality of notification information depending on a type of a received message. For example, as shown in FIG. 6 (b), the controller 180 can display a plurality of notification information including one talk message, two text messages, and five e-mail messages. And, the controller 180 can pin notification message selected by a user among a plurality of the notification information.

Figure 7:
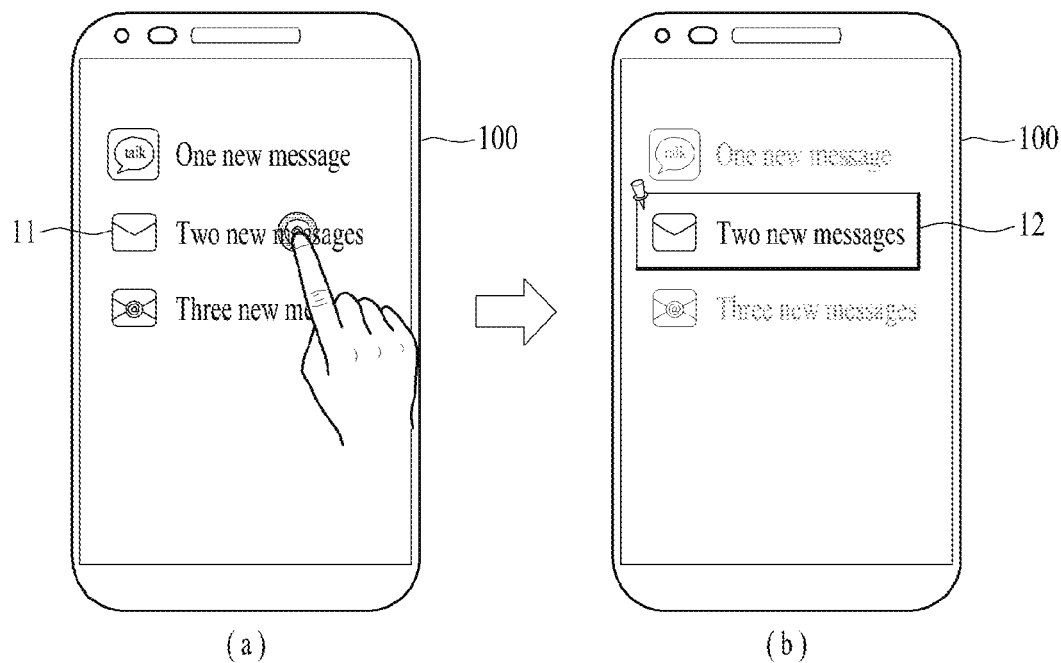

FIG. 7 is a diagram for explaining one embodiment of pinning notification information.

FIG. 7 (a) illustrates a mobile terminal 100 in which single notification information is pinned.

The controller 180 can receive a command input for selecting single notification information 11 from among a plurality of notification information displayed in the mobile terminal. The controller can recognize a touch gesture inputted on the displayed notification information as the command for selecting the notification information.

Or, the controller 100 can recognize a touch gesture touched on the displayed notification information with a pressure equal to or greater than a pressure of the P2 as the command for selecting the notification information. If the touch gesture touched with the pressure equal to or greater than the pressure of the P2 is configured as the command for selecting the notification information, the controller 180 can ignore a touch gesture touched with a pressure less than the pressure of the P2.

FIG. 7 (b) illustrate a mobile terminal 100 in which the selected notification information is pinned.

Similar to a memo fixed on a bulletin board using a pin, the pinning means that selected notification information is fixed or the display of the selected notification information is maintained only.

For example, if a touch gesture touched with a pressure equal to or greater than a pressure of the P2 is inputted, the controller 180 can pin selected notification information or may apply a visual feature (visual effect) to the selected notification information 12.

For example, the controller 180 may display such an image as a pin or a thumbtack on the selected notification information 12, highlight an edge of the selected notification information 12, or apply a visual effect to the selected notification information to make a user feel that the selected notification is projected compared to other notification information.

And, the controller 180 may display the selected notification information 12 in bold strikes or display the selected notification information using a predetermined color. The controller 180 may not display unselected notification information or may display the unselected notification by making the unselected notification information to be blurred.

Figure 8:
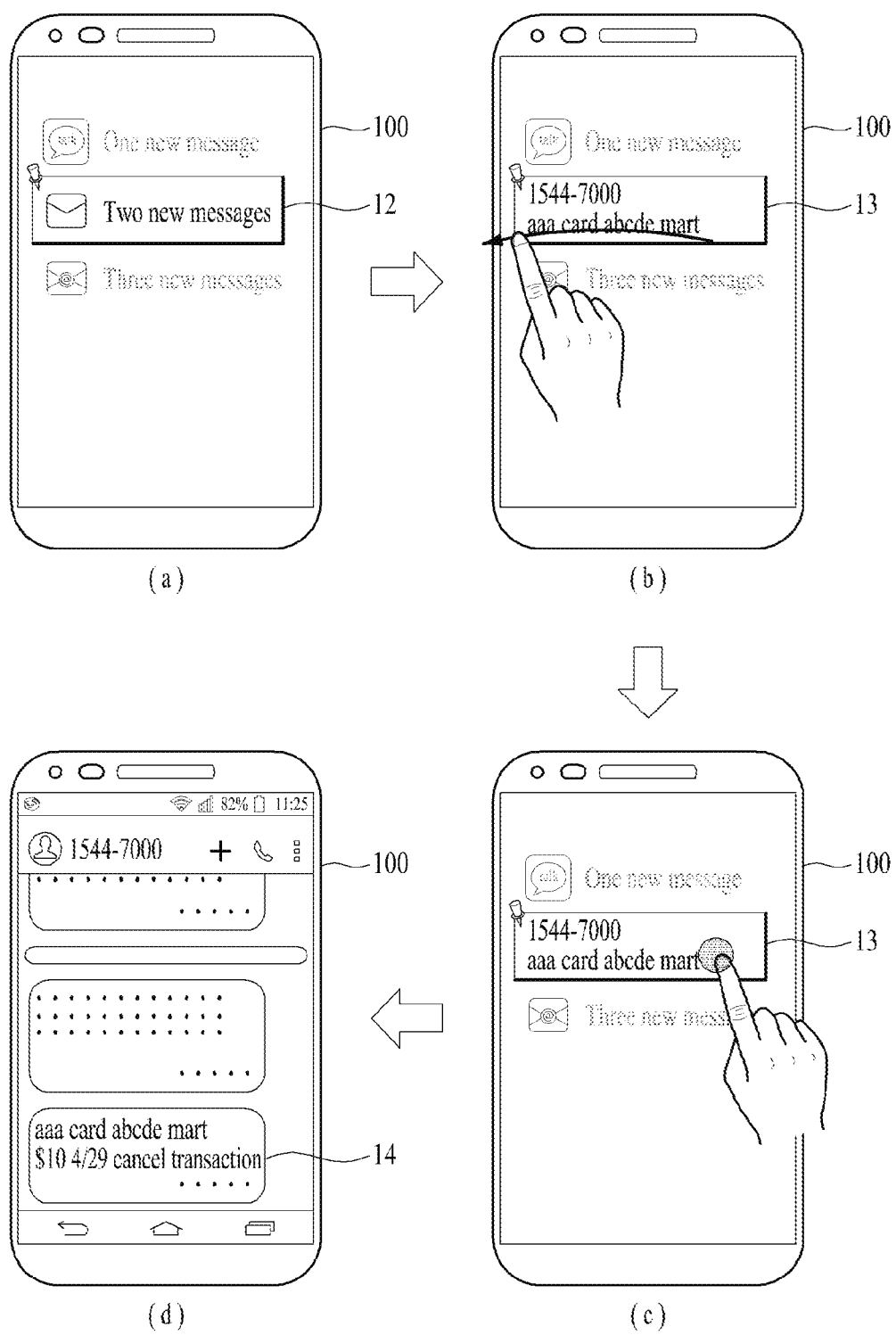

FIG. 8 is a diagram for explaining one embodiment of displaying a notification item included in pinned notification information.

FIG. 8 (a) illustrates a mobile terminal 100 displaying pinned notification information. As mentioned in the foregoing description, if a touch gesture is inputted on one notification information among the displayed notification information, the controller 180 can pin the selected notification information 12. If the selected notification information 12 is pinned, the controller 180 can control an operation related to the pinned notification information 12.

FIG. 8 (b) illustrates a mobile terminal 100 controlling an operation related to the pinned notification information.

The pinned notification information can include a plurality of notification items. For example, if the controller 180 receives two text messages, the controller can display notification information indicating that the two text messages are received.

A user can pin text message notification information. Hence, the text message notification information can include two notification items.

In particular, if a touch gesture for dragging the pinned notification information in a second direction different from the first direction is received from a user, the controller 180 can sequentially display notification items 13 included in the pinned notification information in response to the inputted touch gesture.

FIG. 8 (c) illustrates a mobile terminal 100 in which the displayed notification item 13 is selected.

The controller 180 can display summary information of the notification item 13. For example, the summary information can include a transmitter, a telephone number, and brief content. If a command for selecting the displayed notification item 13 is inputted, the controller 180 can execute an application corresponding to the notification item 13.

FIG. 8 (*d*) illustrates a mobile terminal 100 in which an application corresponding to the notification item 13 is executed. For example, the notification item 13 displayed in FIG. 8 corresponds to a notification item related to a text message application. And, the controller can display contents 14 of the displayed notification item 13. For example, the contents 14 may correspond to a received message. In particular, if the displayed notification item 13 is selected, the controller 180 executes an application corresponding to the displayed notification item 13 and can display the contents 14 of the displayed notification item 13 via the executed application.

Meanwhile, the mobile terminal 100 can receive a touch gesture input, which is touched with a pressure equal to or greater than a pressure of the P2 and dragged in a second direction different from the first direction.

Figure 9:
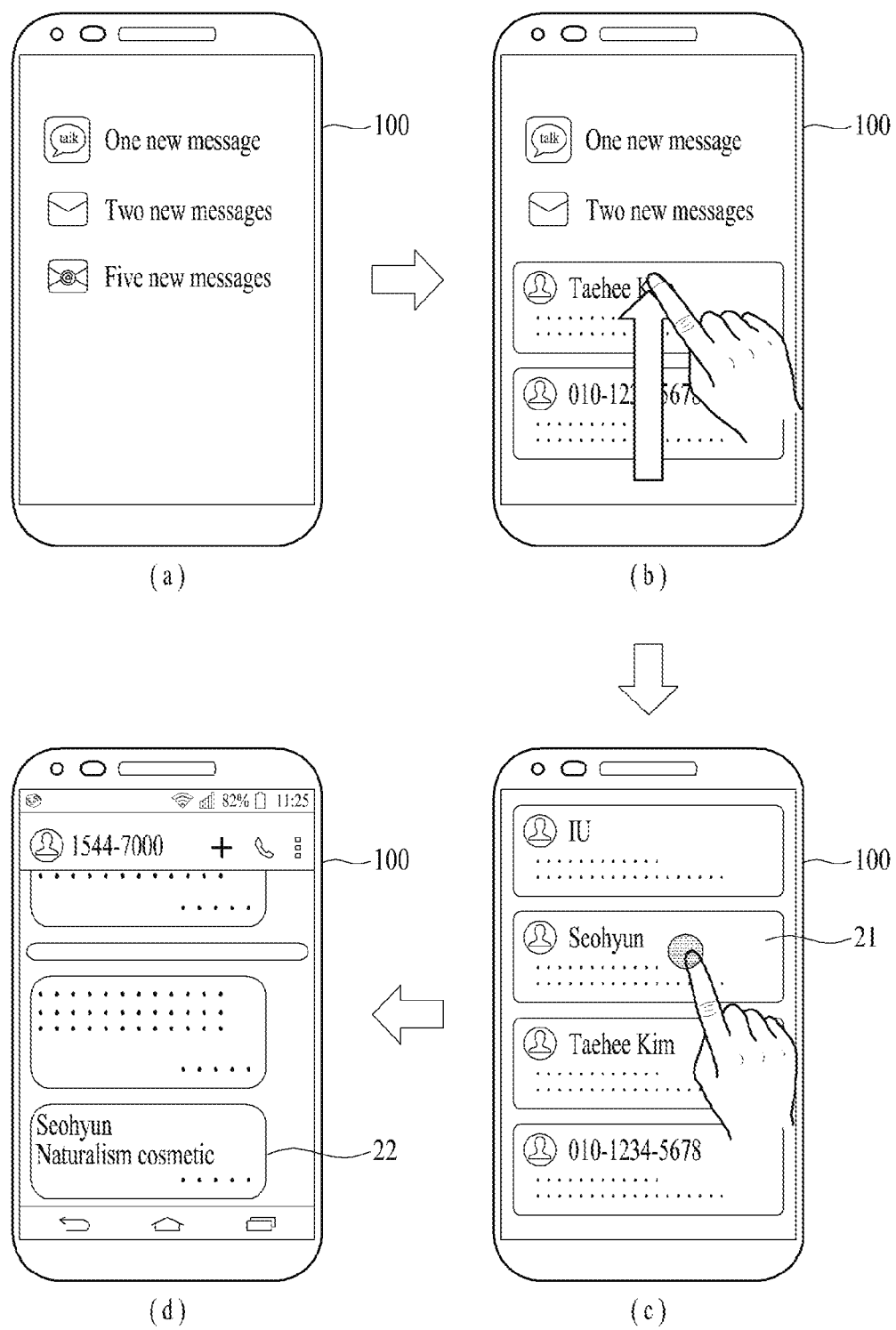

FIG. 9 is a diagram for explaining one embodiment of executing an application related to a notification item included in notification information.

FIG. 9(*a*) illustrates a mobile terminal 100 displaying notification information.

If a touch gesture touched with a pressure equal to or greater than a pressure of the P2 and dragged in a second direction opposite to the first direction is received, the controller 180 can execute the function of displaying the notification information.

For example, the first direction may correspond to a down direction. The controller 180 can maintain the displayed notification information for prescribed time. The controller 180 can receive an input of a touch gesture touched with a pressure equal to or greater than a pressure of the P2 and dragged in an up direction opposite to the down direction.

FIG. 9 (*b*) illustrates a mobile terminal 100 displaying a notification item in response to a touch gesture touched with a pressure equal to or greater than a pressure of the P2 and dragged in an up direction opposite to the down direction.

In this case, the controller 180 can display only a notification item included in notification information on which the touch gesture touched with the pressure equal to or greater than the pressure of the P2 and dragged in the up direction opposite to the down direction is inputted.

For example, as shown in FIG. 9, such notification information as one talk message, two text messages, and five e-mail messages can be included in a screen of the touch screen 151.

In this case, if the touch gesture touched with the pressure equal to or greater than the pressure of the P2 and dragged in the up direction opposite to the down direction is inputted on the e-mail notification information only, the controller 180 can display a notification item included in the e-mail notification information only.

And, if the touch gesture touched with the pressure equal to or greater than the pressure of the P2 and dragged in the up direction opposite to the down direction is inputted on the e-mail notification information or the text message notification information, the controller 180 can display a notification item included in the e-mail notification information or the text message notification information.

If an input of a touch gesture, which is dragged in a third direction opposite to the first direction, is received on a screen on which at least one notification information is displayed, the controller 180 can display a notification item included in all notification information.

For example, the mobile terminal 200 can include such notification information as one talk message, two text messages, and five e-mail messages. If an input of a touch gesture dragged in the third direction opposite to the first direction is received, the controller 180 can display all of a notification item included in talk notification information, a notification item included in text message notification information, and a notification item included in e-mail notification information.

FIG. 9 (*c*) illustrates a mobile terminal 100 in which a specific notification item 21 is selected from among all notification items displayed on a screen according to a touch gesture input dragged in the third direction. The controller 180 can display summary information of the notification item 21.

If a command for selecting the displayed notification item 21 is inputted, the controller 180 can execute an application associated with (related to) the selected notification item 21.

FIG. 9 (*d*) illustrates a mobile terminal 100 in which an application associated with the selected notification item 21 is executed.

In this case, the selected notification item 21 may correspond to a notification item related to a text message application.

In this case, the controller 180 executes the text message application and can display contents 22 of the notification item 21 via the executed text message application. The contents 22 of the notification item 21 may correspond to a received message.

In the foregoing description, an embodiment of a mobile terminal 100 of which a size of a display unit is equal to or greater than a prescribed size has been explained. Yet, the mobile terminal 100 may include a display unit of a small size as well. If the size of the display unit is small, it may be difficult for the mobile terminal 100 to display all information on the display unit.

Figure 10:
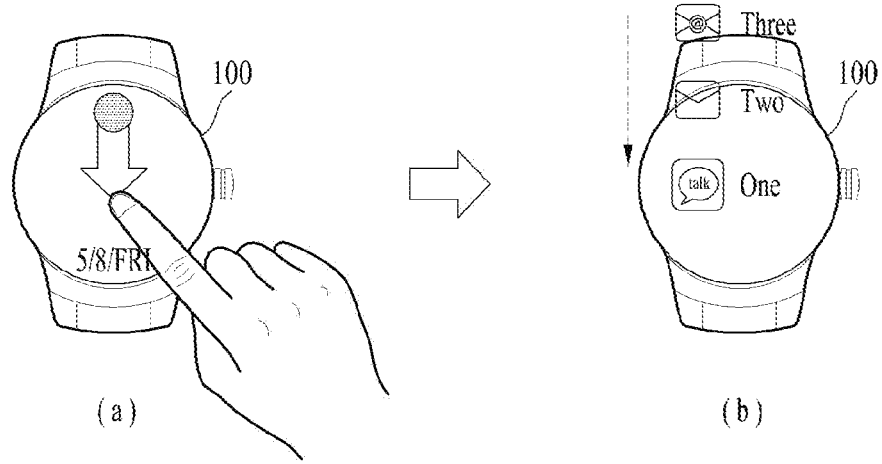

FIG. 10 is a diagram for explaining one embodiment of displaying notification information in a wearable device.

FIG. 10 (*a*) illustrates a mobile terminal 100 receiving an input of a touch gesture with a pressure less than a pressure of the P2. For example, the mobile terminal 100 may correspond to a wearable device and a size of display unit of the mobile terminal may be less than a predetermined size. The mobile terminal 100 may be in a standby state that the display unit is maintained in an off state.

The controller 180 can receive a touch gesture input dragged in a first direction from a user. For example, the first direction may correspond to a direction moving from the top to the bottom.

If the touch gesture touched with the pressure less than the P2 and dragged in the first direction is inputted, the controller 180 can execute a first function.

FIG. 10 (*b*) illustrates the mobile terminal 100 in which the first function is executed. For example, the first function may correspond to a function of displaying notification information.

In particular, if the size of the display unit of the mobile terminal 100 is less than a predetermined size, the first function may correspond to the function of displaying the notification information.

The controller 180 can display notification information on the display unit. The controller 180 can include a plurality of notification information and can sequentially display a plurality of the notification on the display unit.

In particular, the controller 180 displays talk message notification information, displays text message notification information instead of the displayed talk message notification information, and displays e-mail message notification information instead of the displayed text message notification information.

The controller 180 displays one notification information and then automatically displays notification information instead of the displayed notification information to sequentially scroll the notification information. Or, if a drag touch gesture moving in a specific direction is inputted from a user, the controller 180 can sequentially display notification information in a direction of the inputted drag touch gesture.

The controller 180 can display notification information during predetermined time. If the predetermined time elapses, the controller 180 can turn off the display unit.

Figure 11:
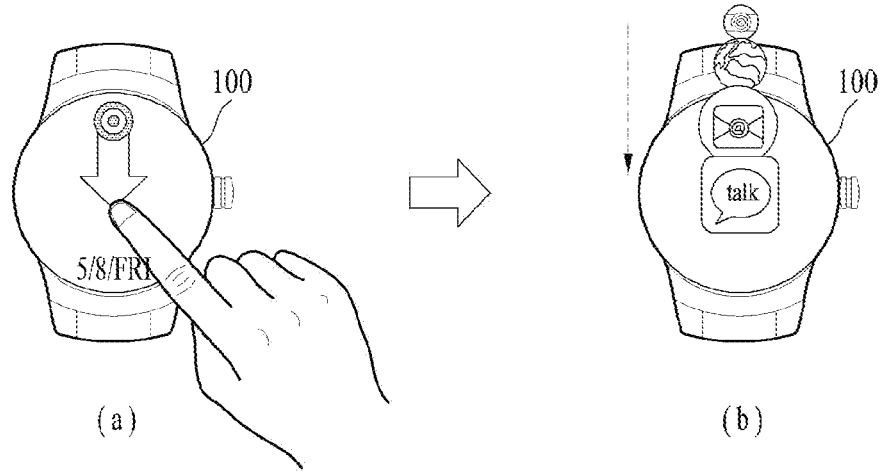

FIG. 11 is a diagram for explaining one embodiment of displaying a use history application in a wearable device.

FIG. 11 (a) illustrates a mobile terminal 100 receiving an input of a touch gesture with a pressure equal to or greater than a pressure of the P2. The mobile terminal 100 may be in a standby state.

If the touch gesture touched with the pressure equal to or greater than the P2 and dragged in the first direction is inputted from a user, the controller 180 can execute a second function.

FIG. 11 (b) illustrates the mobile terminal 100 in which the second function is executed.

For example, the second function may correspond to a function of displaying use history information of an application. The function of displaying the use history information of the application may correspond to a function of displaying information of a recently used application or a function of displaying information according to a use frequency of an application.

The controller 180 can include a plurality of use history information and can sequentially display a plurality of the use history information. Or, the controller 180 may display single use history information and then sequentially display the remaining use history information.

If a touch gesture touched with a pressure equal to or greater than the pressure of the P2 and dragged in the first direction is inputted again after the second function is executed, the controller 180 can sequentially display the use history information in accordance with the direction of inputted drag.

Figure 12:
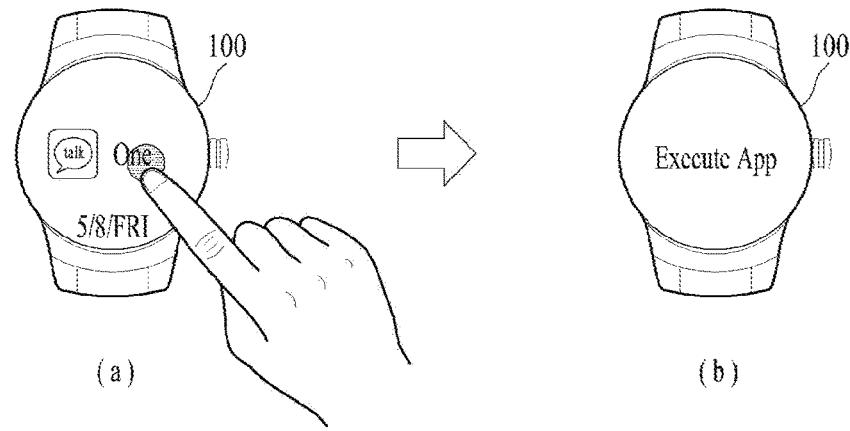

FIG. 12 is a diagram for explaining one embodiment of executing an application related to an item selected in a wearable device.

FIG. 12 (a) illustrates a mobile terminal 100 in which displayed notification information is selected. In particular, the controller 180 can include a plurality of notification information, sequentially display a plurality of the notification information, and receive a command for selecting the displayed notification information.

Similarly, the controller 10 can include use history information of a plurality of applications and sequentially display the use history information of a plurality of the applications. And, the controller 180 can receive a command for selecting use history information of a displayed application.

FIG. 12 (b) illustrates a mobile terminal 100 in which an application related to selected notification information is executed.

In this case, if a touch gesture touching the notification information with a pressure equal to or greater than the P2 is inputted, the controller 180 can recognize the touch gesture as a command for selecting the notification information.

Similarly, the controller 180 can sequentially display use history information of applications. If use history information of the displayed application is selected, the controller 180 can execute an application related to the use history information of the displayed application.

Figure 13:
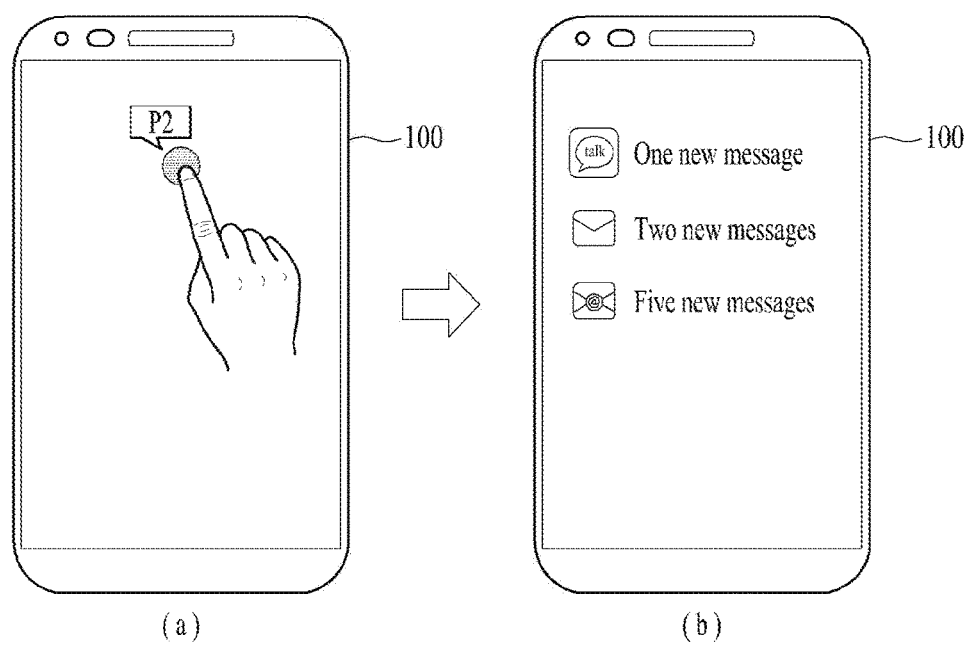
Figure 14:
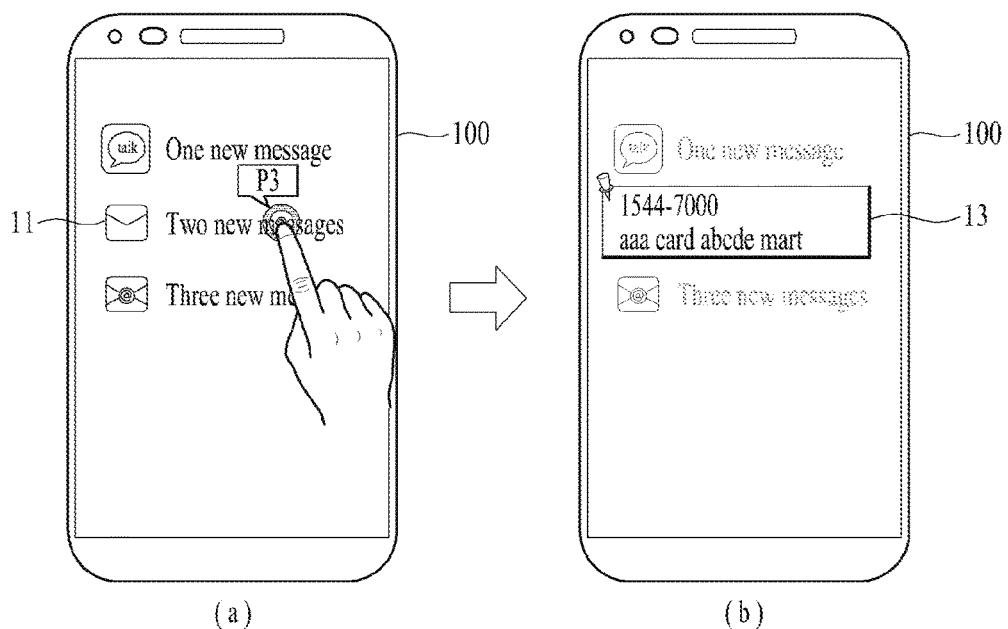
Figure 15:
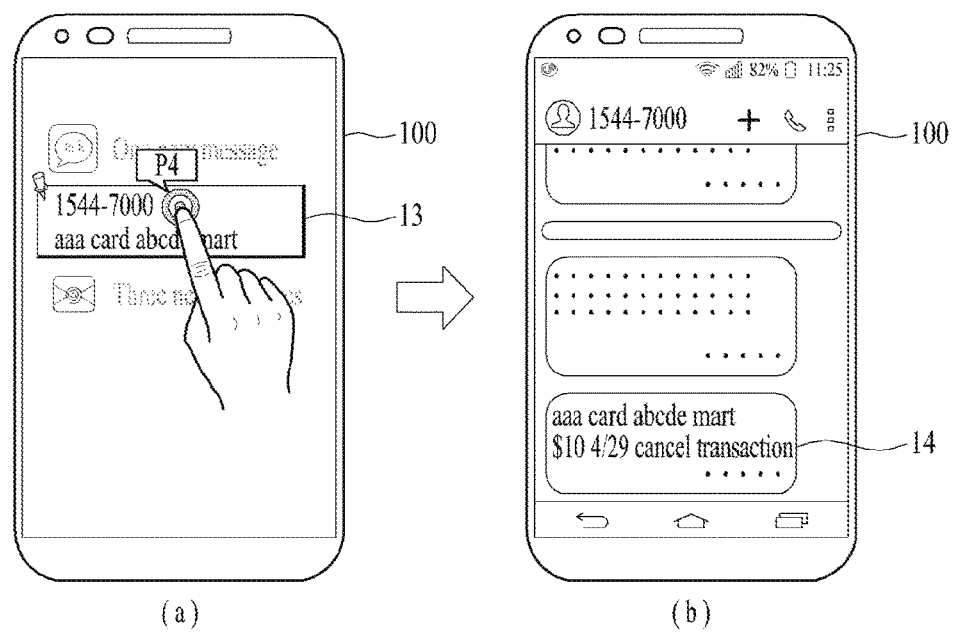

FIGS. 13 to 15 are diagrams for explaining one embodiment of differently displaying detail contents of notification information according to a change of pressure strength of a touch.

Referring to FIGS. 13 to 15, if a touch input inputted on a screen with gradually increasing pressure strength equal to or greater than the P2 is received, the controller 180 can differently display contents related to at least one or more notification information on the screen according to an increment of the pressure strength of the received touch input.

In particular, as the increment of the pressure strength of the received touch input is getting bigger, the controller 180 can display the notification information in phases (i.e., from partial content to whole contents or from partial content to detail content).

For example, as shown in FIG. 13 (a), if a touch input having pressure strength equal to or greater than the P2 is initially received on a screen, as shown in FIG. 13 (b), the controller 180 can display number information indicating the total number of at least one or more notification information or a list including the at least one or more notification information.

In this case, the screen shown in FIG. 13 (a) may correspond to a screen of a state that the touch screen 151 is turned off. Or, the screen may correspond to a standby screen of a state that the touch screen is turned on or is in a standby state.

If a touch input having pressure strength equal to or greater than the P2 is received on a screen in a state that the screen is turned off, the controller 180 turns on the screen and may be then able to display number information indicating the total number of the at least one or more notification information or a list including the at least one or more notification information on the screen.

If a touch input having pressure strength equal to or greater than the P2 is received on a standby screen, the controller 180 can display number information indicating the total number of the at least one or more notification information or a list including the at least one or more notification information on the standby screen. Or, the controller 180 switches the standby screen into a notification information display function screen and may be then able to display number information indicating the total number of the at least one or more notification information or a list including the at least one or more notification information on the notification information display function screen.

Subsequently, as shown in FIG. 14 (a), if a touch input having P3 pressure strength greater than the P2 pressure strength is received on first notification information 11 belonging to the list, as shown in FIG. 14 (b), the controller 180 can display at least one notification item 13 included in the first notification information 11.

Subsequently, as shown in FIG. 15 (a), if a touch input having P4 pressure strength greater than the P3 pressure strength is received on the notification item 13, as shown in FIG. 15 (b), the controller 180 executes an application associated with the notification item 13 and can display contents related to the notification item 13 via the executed application.

In this case, if two or more applications are associated with the notification item 13, the controller 180 can display a list including the two or more applications to enable a user to select an application preferred by the user from the list.

And, if two or more applications are associated with the notification item 13, the controller 180 can execute an application most frequently used by a user among the two or more applications.

If the notification item 13 corresponds to a message (or, e-mail) received by a specific recipient, the controller 180 executes a message-related (or, e-mail-related) application, displays contents of the received message on a screen of the message-related application, displays texts of at least one or more conversation contents frequently transmitted to the specific recipient, and recommends the texts to a user.

In the following, a procedure of searching for pictures including a subject identical to a specific subject of a picture currently displayed on a screen from pictures stored in advance using a force touch having predetermined pressure strength and displaying the searched pictures is explained in detail with reference to FIGS. 16 to 23.

FIGS. 16 to 23 are diagrams for explaining a procedure of searching for an associated image using a force touch.

Referring to FIGS. 16 to 23, if an image is displayed on a screen of the touch screen 151, the first function mentioned earlier in FIG. 3 may correspond to a function of selecting a specific subject from the image and the second function may correspond to a function of searching for an image including a subject identical to the displayed specific subject.

In particular, the controller 180 can display an image including at least one subject on the screen of the touch screen 151. In this case, the image may correspond to a preview image received from the camera 121 operated by a user, an image selected by a user from images stored in the memory 170, or an image displayed on a web site (or a web page). And, the image may correspond to a picture in which at least one subject is included or a video configured by a scene in which at least one subject is included.

And, the controller 180 senses whether or not a touch having pressure strength of the P2 is inputted on the at least one subject in the image. If a touch having pressure strength equal to or greater than the P2 is inputted, the controller 180 searches for one or more images including a subject identical to the subject on which the touch having pressure strength equal to or greater than the P2 is inputted from among images stored in advance in the memory 170 and can display the searched images on the image.

Figure 16:
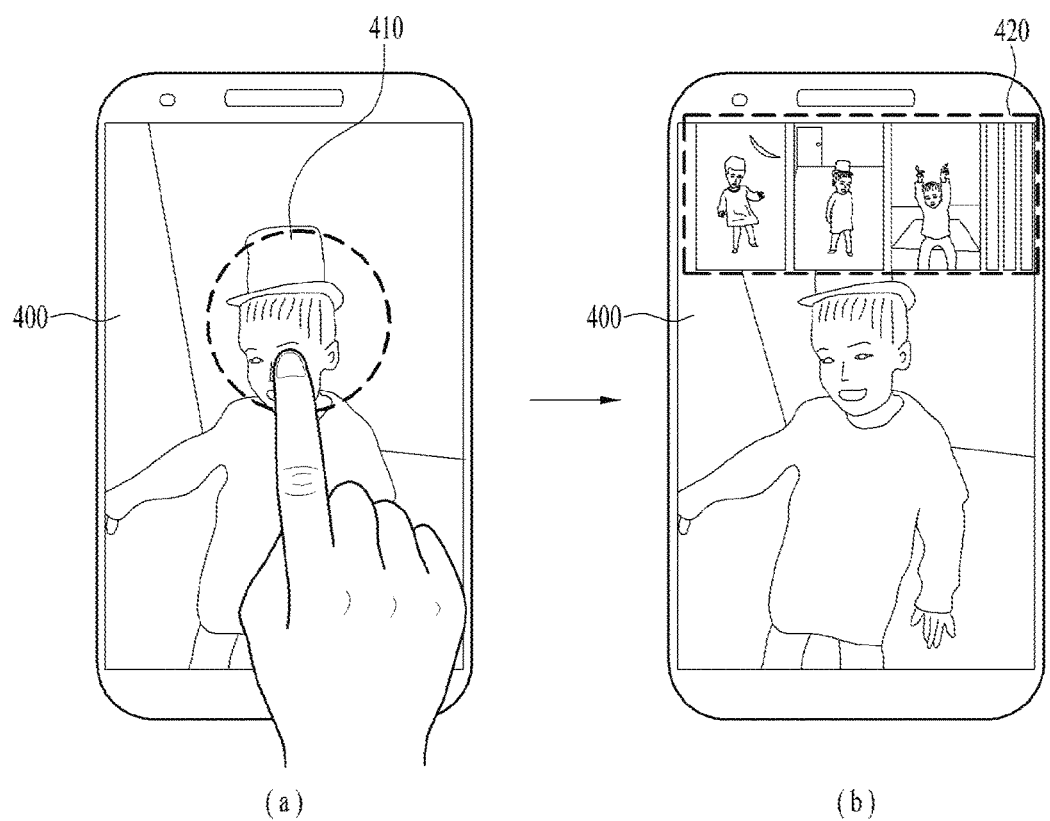
FIGS. 16 to 23 are diagrams for explaining a procedure of searching for an associated image using a force touch.

In particular, FIG. 16 (*a*) illustrates that a first image 400 including a face 410 of a first subject is displayed on the touch screen 151. If a touch having pressure strength equal to or greater than the P2 is inputted on the face 410 of the first subject, the controller 180 recognizes the face 410 of the first subject, recognizes faces of subjects included in images stored in the memory 170, and searches for images including a subject of a face identical to the face 410 of the first subject from among the images stored in the memory 170.

In this case, if a part on which the face 410 of the first subject is displayed is dragged on the first image 400 while the touch having the pressure strength equal to or greater than the P2 is maintained, the controller 180 can recognize a face of the dragged part.

And, as shown in FIG. 16 (*b*), the controller 180 can display the searched images on the first image 400 in a form of thumbnail 420.

In this case, among the searched images, the controller 180 can display images generated prior to the first image 400 or images generated at the same date with the first image 400 on the first image 400 in a form of thumbnail.

In particular, according to FIG. 16, if a touch having pressure strength equal to or greater than the P2 is inputted on a specific person in a portrait, previously taken pictures of a person identical to the specific person or pictures of the person identical to the specific person generated on the same date are searched from the memory 170 and displayed.

More specifically, when a user intends to watch pictures associated with a person included in a currently displayed picture or watch a current picture and an old picture of the person, the user is able to watch pictures of a person identical to the person using a touch having pressure strength equal to or greater than the P2.

Meanwhile, the controller 180 can display the thumbnail 420 on the first image 400 only when the touch having the pressure strength equal to or greater than the P2 is maintained on the face 410 of the first subject. If the touch having the pressure strength equal to or greater than the P2 is released from the face 410 of the first subject, the controller 180 may not display the thumbnail 420 on the first image.

Figure 17:
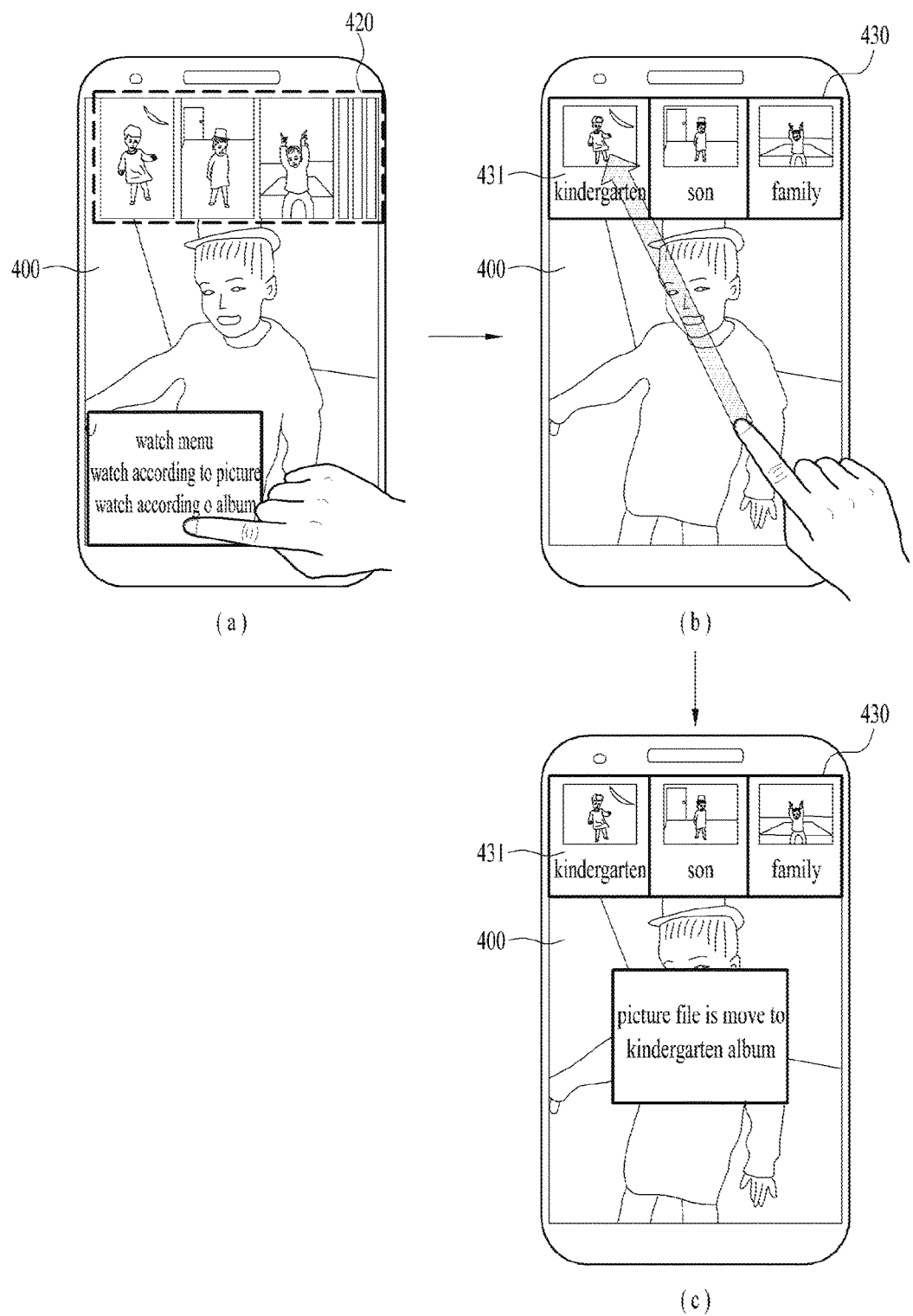

As shown in FIG. 17 (*a*), the controller 180 can display a first watch menu providing a watch function to a user according to a picture and a second watch menu providing a watch function to a user according to an album (or, a folder).

In this case, if the first watch menu is selected, as mentioned earlier in FIG. 16, the controller 180 displays the searched images on the first image 400 in a form of thumbnails 420.

If the second watch menu is selected, as shown in FIG. 17 (*b*), the controller 180 displays albums (or, folders) 430 including all or a part of the images searched in FIG. 16 on the first image 400. The images included in each of the albums (or, folders) 430 are displayed using a preview and a name of a corresponding album (or, a folder) can be displayed on each of the albums (or, folders).

If the first image 400 is touched, dragged and dropped into a specific first album (or, a folder) 431 among the albums (or folders), as shown in FIG. 17 (*c*), the controller 180 can move the first image 400 to the first album (or, folder) 431.

Figure 18:
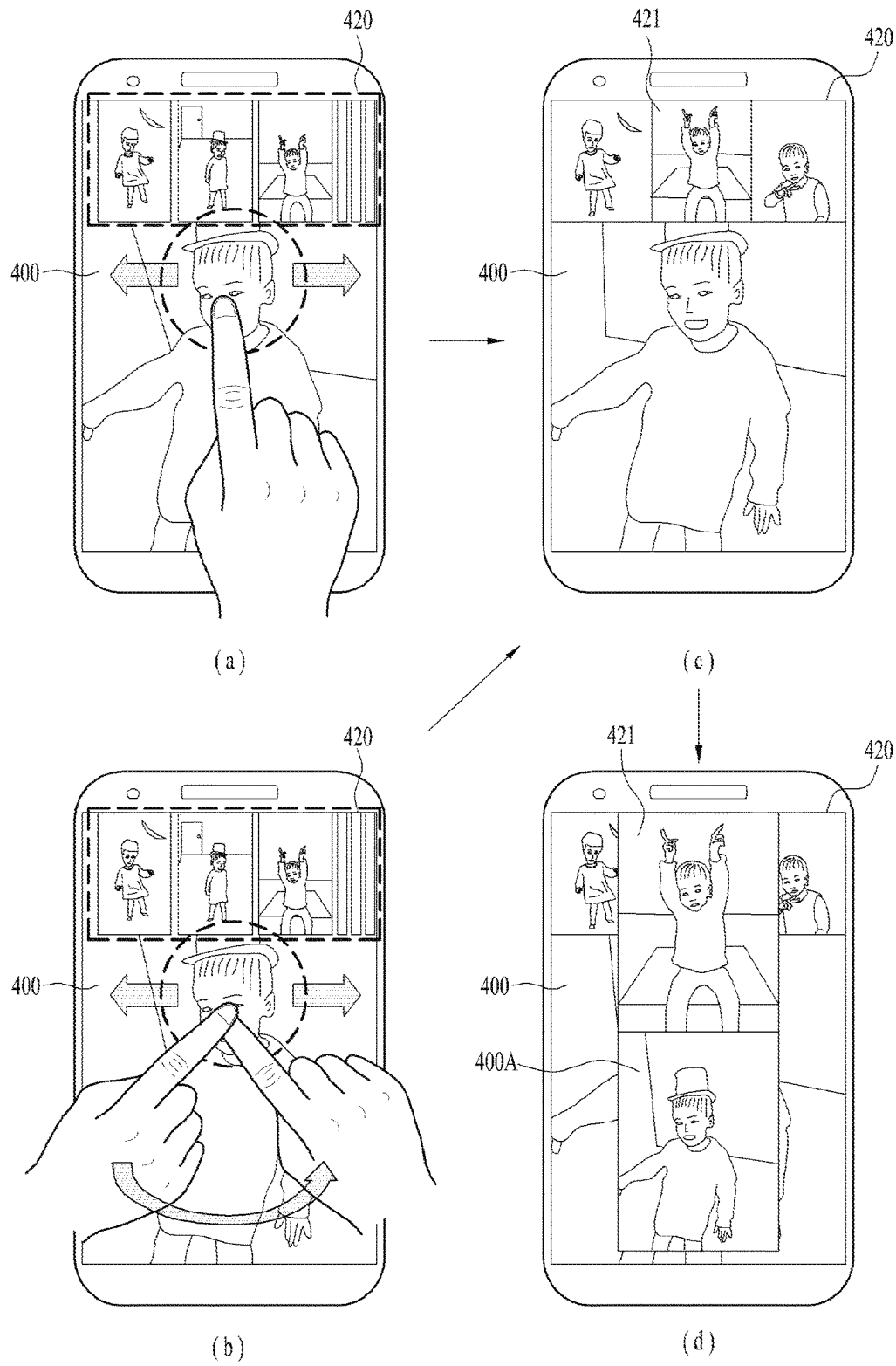

Subsequently, as shown in FIGS. 18 (*a*) and (*b*), when the controller 180 displays the thumbnails 420 on the first image 400, if a pattern of a touch having pressure strength equal to or greater than the P2 is changed while the touch having the pressure strength equal to or greater than the P2 is maintained on a face of a first subject, as shown in FIG. 18 (*c*), the controller 180 can scroll the thumbnails 420 in a specific direction in response to the changed pattern.

For example, as shown in FIG. 18 (*a*), if the touch having the pressure strength equal to or greater than the P2 is dragged in a first direction while the touch having the pressure strength equal to or greater than the P2 is maintained on the face of the first subject, the controller 180 scrolls the thumbnails 420 in the first direction in proportion to a dragging distance of the touch dragged in the first direction.

And, if the touch having the pressure strength equal to or greater than the P2 is dragged in a second direction opposite to the first direction while the touch having the pressure strength equal to or greater than the P2 is maintained on the face of the first subject, the controller 180 scrolls the thumbnails 420 in the second direction in proportion to a dragging distance of the touch dragged in the second direction.

As a different example, as shown in FIG. 18 (*b*), if the touch having the pressure strength equal to or greater than the P2 rotates in a first direction while the touch having the pressure strength equal to or greater than the P2 is maintained on the face of the first subject, the controller 180 scrolls the thumbnails 420 in the first direction in proportion to a rotation amount rotated in the first direction.

And, if the touch having the pressure strength equal to or greater than the P2 rotates in a second direction opposite to the first direction while the touch having the pressure strength equal to or greater than the P2 is maintained on the face of the first subject, the controller 180 scrolls the thumbnails 420 in the second direction in proportion to a rotation amount rotated in the second direction.

As shown in FIG. 18 (d), if pressure strength of the touch having the pressure strength equal to or greater than the P2 becomes weaker than pressure strength equal to or less than the P1 in the middle of scrolling the thumbnails 420 in a specific direction in accordance with a change of a pattern of the touch having the pressure strength equal to or greater than the P2, the controller 180 can display an image positioned at the center of the thumbnails 420 or an image of a specific thumbnail 421 at which a cursor (or, highlight) is positioned together with the first image 400 at the timing that the pressure strength of the touch becomes weaker than the pressure strength equal to or less than the P1.

And, if the pressure strength of the touch becomes stronger as strong as the pressure strength equal to or greater than the P2 again, the controller 180 may stop displaying the image of the specific thumbnail 421.

And, if the touch having the pressure strength equal to or greater than the P2 is released in the middle of scrolling the thumbnails 420 in a specific direction in accordance with a change of a pattern of the touch having the pressure strength equal to or greater than the P2, the controller 180 can display an image positioned at the center of the thumbnails 420 or an image of a specific thumbnail 421 at which a cursor (or, highlight) is positioned instead of the first image 400 at the timing that the touch having the pressure strength equal to or greater than the P2 is released.

Figure 19:
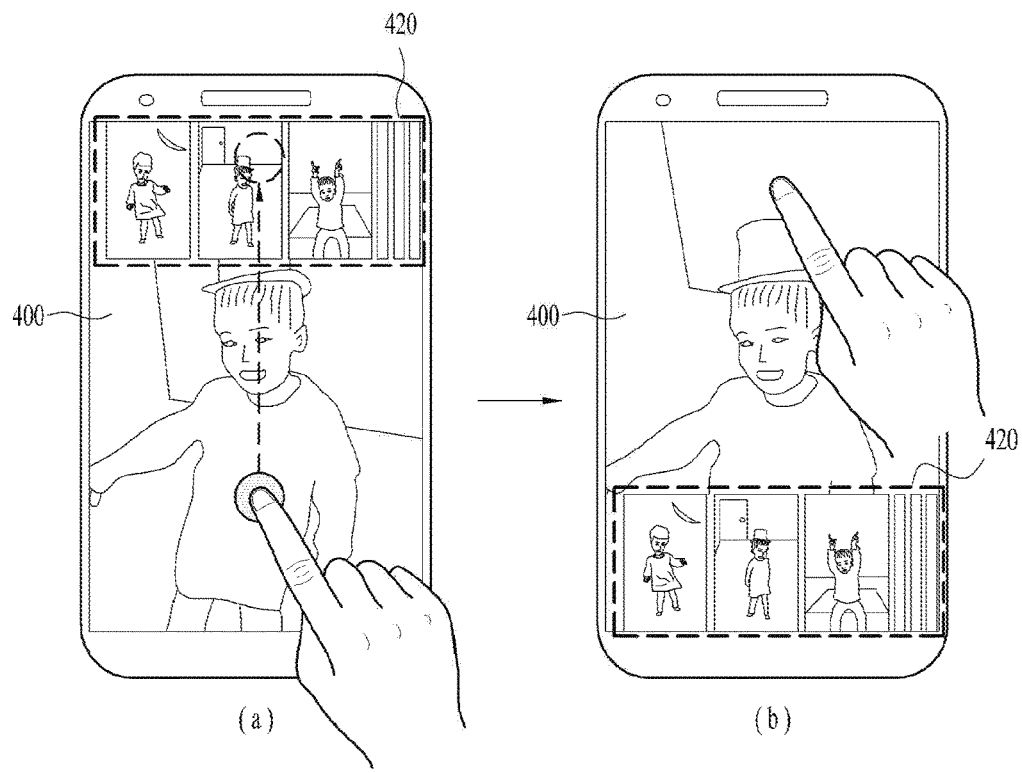

As shown in FIG. 19 (a), when the thumbnails 420 are displayed on the first image 400, if a touch having pressure strength equal to or greater than the P2 is inputted on a specific point of the first image 400, as shown in FIG. 19 (b), the controller 180 moves the thumbnails 420 to a position opposite to the specific point to make the thumbnails 420 not to be positioned near the specific point to which the touch having the pressure strength equal to or greater than the P2 is inputted.

Figure 20:
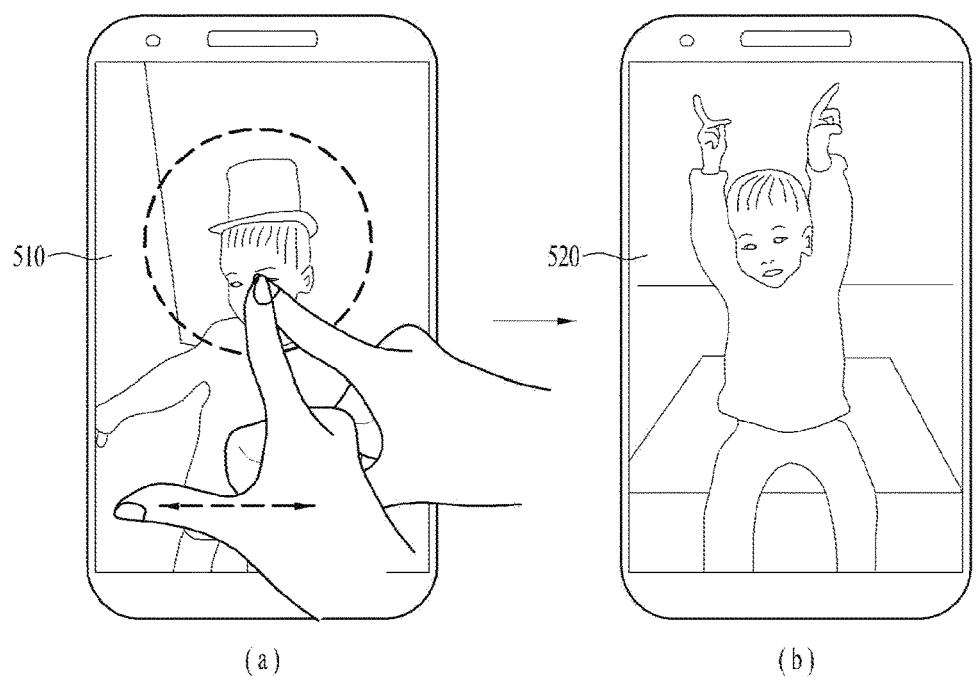

As shown in FIG. 20 (a), if the touch having the pressure strength equal to or greater than the P2 is inputted on a face of a first person included in a first image 500, the controller 180 searches for images including a face of a person identical to the face of the first person on which the touch having the pressure strength equal to or greater than the P2 is inputted.

When the touch having the pressure strength equal to or greater than the P2 is maintained, if a specific point is additionally touched on the first image 500 and is dragged (flicked) in a specific first direction, as shown in FIG. 20 (b), the controller 180 can display a second image 520 instead of the first image among the searched images.

In particular, in a state that the touch having the pressure strength equal to or greater than the P2 is maintained, whenever a specific point is additionally touched on the first image 500 and is dragged (flicked) in a specific first direction, the controller 180 can sequentially display the searched images. In this case, the touch dragged (flicked) in the first direction may correspond to a general tap touch or a force touch having specific pressure strength.

Meanwhile, among the images stored in the memory 170, the searched images can include not only an image including a person of a face identical to the face of the first person on which the touch having the pressure strength equal to or greater than the P2 is inputted but also an image generated with the first image 500 at the same date.

Figure 21:
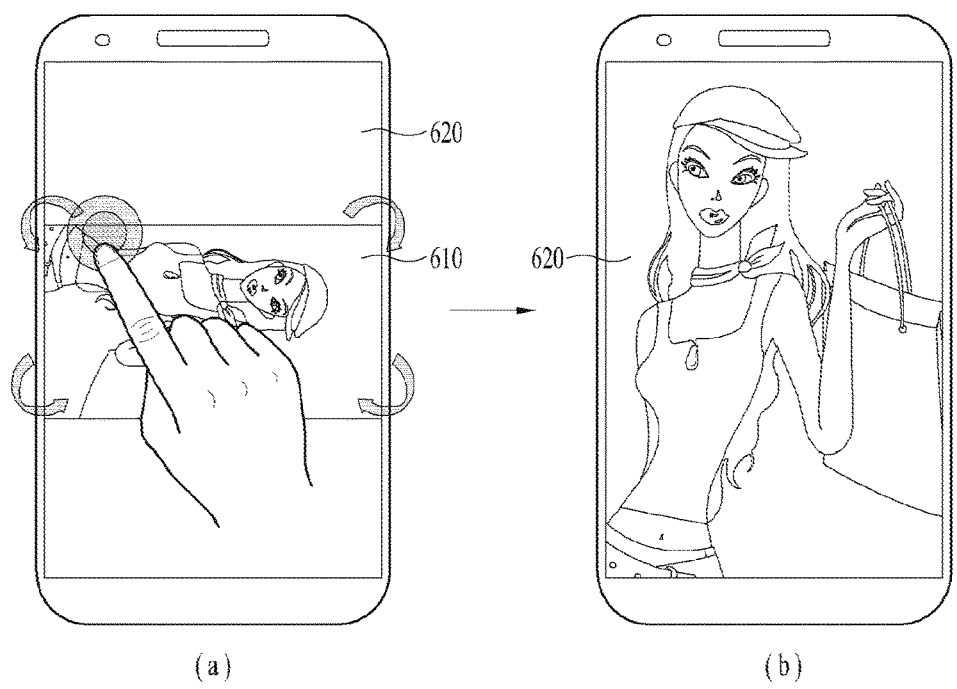

As shown in FIG. 21 (a), if a force touch is inputted on a specific part of a first image 610, the controller 180 displays a rotation UI (user interface) for rotating the first image on the part to which the touch having the pressure strength equal to or greater than the P2 is inputted. Subsequently, as shown in FIG. 21 (b), the controller 180 displays a second image 620 by rotating the first mage 610 according to a rotation touch gesture inputted on the rotation UI. In this case, the specific part may correspond to an edge part of the first image 610.

Figure 22:
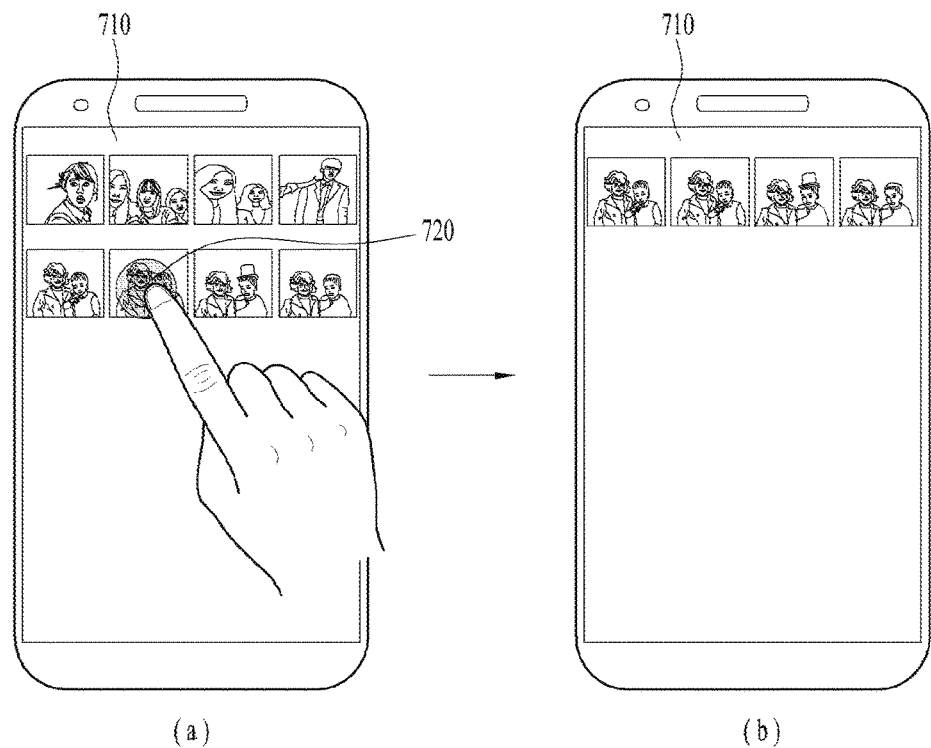

As shown in FIG. 22 (a), when a thumbnail view screen 710 including a plurality of thumbnails is displayed, if a touch having pressure strength equal to or greater than the P2 is inputted on a specific first thumbnail 720, the controller 180 identifies thumbnails including a person identical to at least one person included in the first thumbnail 720 in the thumbnail view screen 710. Subsequently, as shown in FIG. 22 (b), the controller 180 displays the identified thumbnails only in the thumbnail view screen 710.

Figure 23:
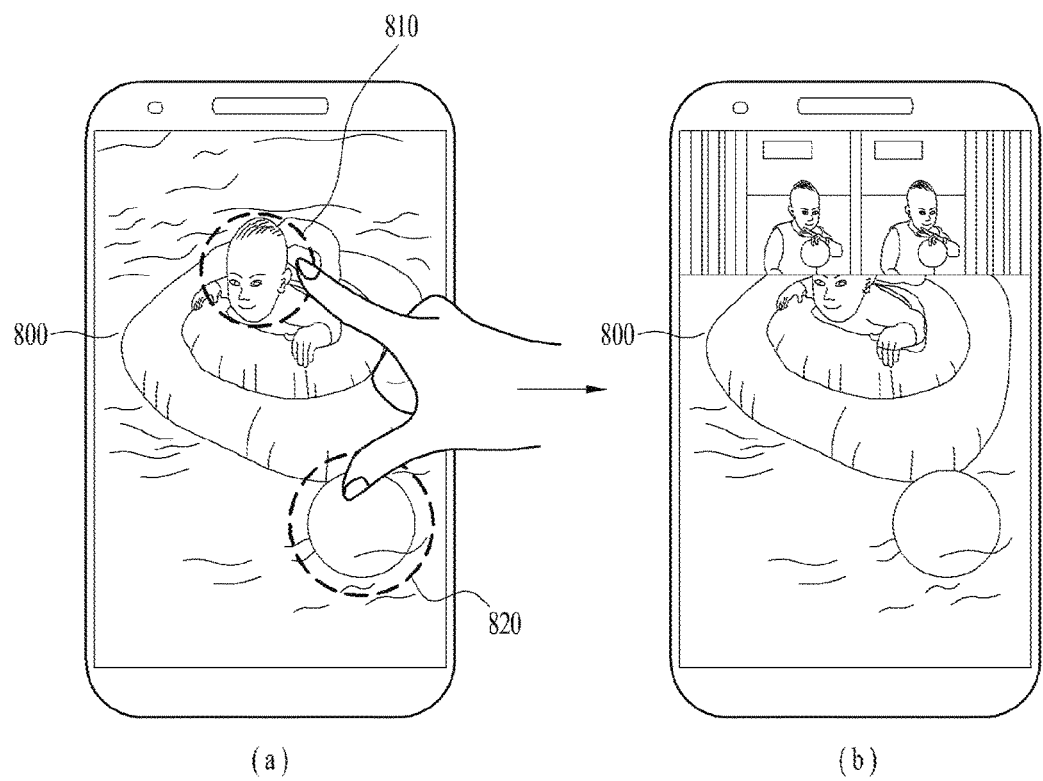

Lastly, as shown in FIG. 23 (a), if a touch having pressure strength equal to or greater than the P2 is simultaneously inputted on a first subject 810 and a second subject 820 included in a first image 800, the controller 180 searches for images including subjects identical to the first and the second subjects on which the touch having the pressure strength equal to or greater than the P2 is inputted among the images stored in the memory 170.

Subsequently, as shown in FIG. 23 (b), the controller 180 displays the searched images on the first image 800 in a form of thumbnails.

It will be apparent to those skilled in the art that various modifications and variations can be made therein without departing from the spirit and scope of the invention.

Various embodiments may be implemented using a machine-readable medium having instructions stored thereon for execution by a computer to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The computer may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:
1. A mobile terminal, comprising:
a touch screen configured to display information and receive inputs of different pressure; and
a controller configured to:
receive a first touch input via the touch screen;

cause the touch screen to display a first function screen when the first touch input includes a drag in a first direction and a pressure of the first touch input is less than a predetermined threshold; and cause the touch screen to display a second function screen when the first touch input includes a drag in the first direction and the pressure of the first touch input is greater than or equal to the predetermined threshold, wherein the second function screen includes a notification information screen, and wherein the controller is further configured to pin a notification item displayed on the notification information screen in response to a second touch input received to the notification item with a pressure greater than or equal to the predetermined pressure.

2. The mobile terminal of claim 1, wherein the controller is further configured to cause the touch screen to display one or more other pinned notification items in response to a third touch input received to the pinned notification item in a second direction different from the first direction.

3. The mobile terminal of claim 1, wherein the controller is further configured to execute an application and cause the touch screen to display content corresponding to a selected notification item displayed on the notification information screen via the executed application in response to a selection touch input received to the selected notification item.

4. The mobile terminal of claim 1, wherein:
the notification information screen includes a particular one or more notification items of all available notification items at the mobile terminal; and
the controller is further configured to cause the touch screen to display a notification view screen corresponding to the all available notification items in response to another touch input received to the notification information screen in a third direction opposite to the first direction.

5. The mobile terminal of claim 1, wherein the controller is further configured to cause the touch screen to:
display first content related to a particular notification item of the notification information screen in response to a selection touch input received to the particular notification item when a pressure of the selection touch input is greater than or equal to the predetermined pressure; and
change displayed content related to the particular notification item as a pressure of the selection touch input increases.

6. The mobile terminal of claim 5, wherein the first content includes a number indicating a total number of notification items corresponding to the particular notification item.

7. The mobile terminal of claim 6, wherein the controller is further configured to cause the touch screen to display one or more notification items corresponding to the particular notification item in response to an increase of the pressure of the selection touch input to a second pressure higher than the predetermined pressure.

8. The mobile terminal of claim 7, wherein the controller is further configured to execute an application associated with the particular notification item and cause the touch screen to display content related to the particular notification item via the executed application in response to an increase of the pressure of the selection touch input to a third pressure higher than the second pressure.

9. A mobile terminal, comprising:
a touch screen configured to display information and receive inputs of different pressure; and
a controller configured to:
receive a first touch input via the touch screen;
cause the touch screen to display a first function screen when the first touch input includes a drag in a first direction and a pressure of the first touch input is less than a predetermined threshold; and
cause the touch screen to display a second function screen when the first touch input includes a drag in the first direction and the pressure of the first touch input is greater than or equal to the predetermined threshold,
wherein the first function screen includes a notification information screen and the second function screen includes an application history information screen.

10. The mobile terminal of claim 9, wherein the controller is further configured to cause the touch screen to sequentially display notification items of the notification information screen or sequentially display application history items of the application history information screen by automatically scrolling the notification items or the application history items.

11. The mobile terminal of claim 9, wherein the controller is further configured to execute an application associated with a particular notification item of the notification information screen or associated with a particular application history item of the application history information screen when a selection touch input to the particular notification item or the particular application history item is received with a pressure greater than or equal to the predetermined pressure.

12. A mobile terminal, comprising:
a touch screen configured to display information and receive inputs of different pressure; and
a controller configured to:
receive a first touch input via the touch screen;
cause the touch screen to display a first function screen when the first touch input includes a drag in a first direction and a pressure of the first touch input is less than a predetermined threshold; and
cause the touch screen to display a second function screen when the first touch input includes a drag in the first direction and the pressure of the first touch input is greater than or equal to the predetermined threshold,
wherein:
the controller is further configured to cause the touchscreen to display a specific image; and
the first function screen corresponds to selection of a specific subject from the displayed specific image; and
the second function screen corresponds to a search for an image containing a subject similar to the displayed specific subject.

13. The mobile terminal of claim 12, wherein the controller is further configured to:
search for one or more images containing subjects similar to the displayed specific subject when a selection touch input is received to the displayed specific subject with a pressure greater than or equal to the predetermined pressure; and
cause the touch screen to display thumbnail images of search results identified from the search.

14. The mobile terminal of claim 13, wherein the controller is further configured to cause the touch screen to only display thumbnail images of search results which were generated prior to a date corresponding to the displayed specific image.

15. The mobile terminal of claim 13, wherein the controller is further configured to scroll the displayed thumbnail images when the selection touch input is dragged in a scrolling direction while the selection touch input is maintained on the displayed specific subject.

16. The mobile terminal of claim 13, wherein the controller is further configured to move the displayed thumbnail images when a second touch input is received to a specific point of the touch screen where the thumbnails are displayed, wherein the displayed thumbnail images are moved to a position away from a location of the second touch input.

17. The mobile terminal of claim 13, wherein the controller is further configured to cause the touch screen to display the thumbnail images only while the selection touch input is maintained on the displayed specific subject.

18. A method of controlling a mobile terminal, the method comprising:
  receiving a first touch input via a touch screen;
  displaying a first function screen when the first touch input includes a drag in a first direction and a detected pressure of the first touch input is less than a predetermined threshold; and
  displaying a second function screen when the first touch input includes a drag in the first direction and the detected pressure is greater than or equal to the predetermined threshold,
  wherein the second function screen includes a notification information screen, and
  wherein the method further comprises:
  pinning a notification item displayed on the notification information screen in response to a second touch input received to the notification item with a pressure greater than or equal to the predetermined pressure.

19. A method of controlling a mobile terminal, the method comprising:
  receiving a first touch input via a touch screen;
  displaying a first function screen when the first touch input includes a drag in a first direction and a detected pressure of the first touch input is less than a predetermined threshold; and
  displaying a second function screen when the first touch input includes a drag in the first direction and the detected pressure is greater than or equal to the predetermined threshold,
  wherein the first function screen includes a notification information screen and the second function screen includes an application history information screen.

20. A method of controlling a mobile terminal, the method comprising:
  displaying a specific image on a touch screen;
  receiving a first touch input via the touch screen;
  displaying a first function screen when the first touch input includes a drag in a first direction and a detected pressure of the first touch input is less than a predetermined threshold; and
  displaying a second function screen when the first touch input includes a drag in the first direction and the detected pressure is greater than or equal to the predetermined threshold,
  wherein the first function screen corresponds to selection of a specific subject from the displayed specific image, and
  wherein the second function screen corresponds to a search for an image containing a subject similar to the displayed specific subject.

* * * * *